Jan. 6, 1970  N. DAVIS ET AL  3,487,997
HUMIDIFYING APPARATUS
Filed Oct. 9, 1967  2 Sheets-Sheet 1
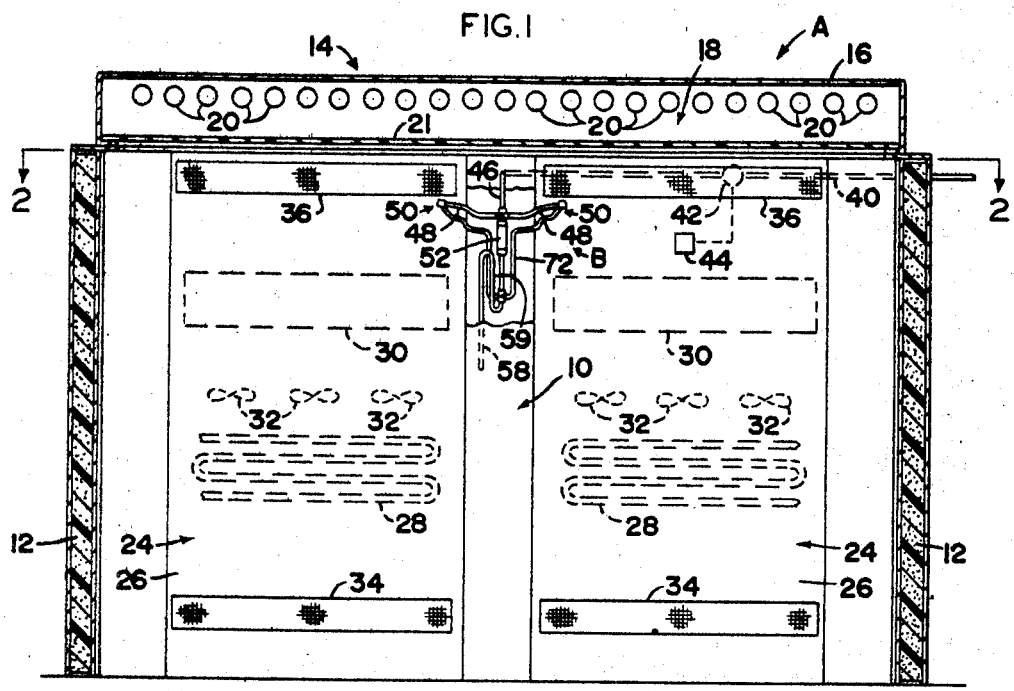
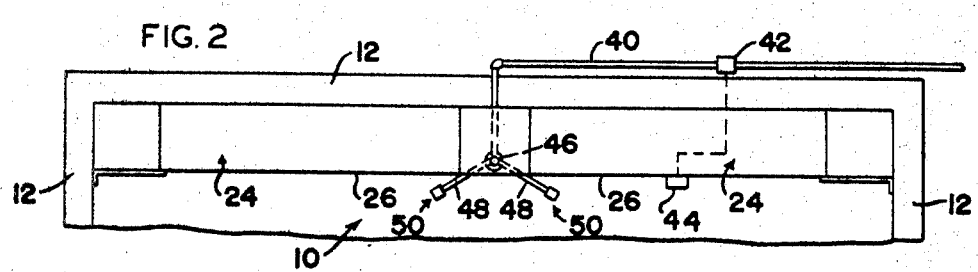
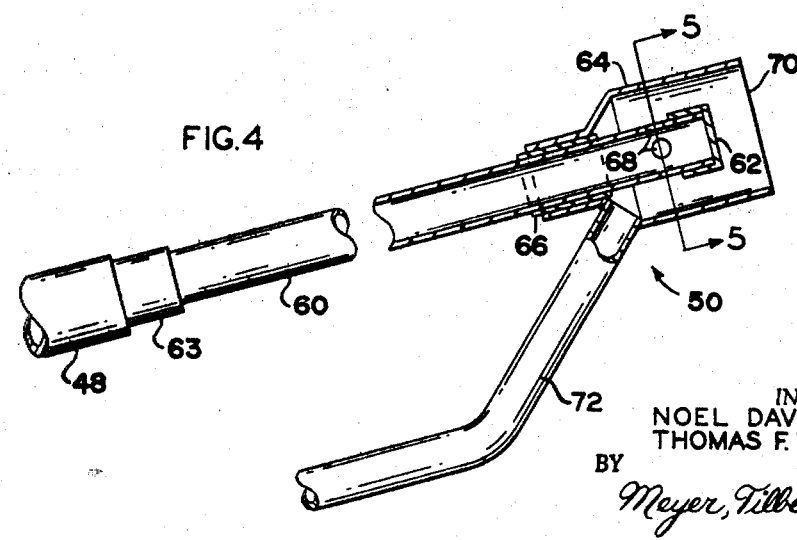
INVENTORS
NOEL DAVIS
THOMAS F. VAN DENBERG
BY
*Meyer, Tilberry & Body*
ATTORNEYS.

Jan. 6, 1970  N. DAVIS ET AL  3,487,997

HUMIDIFYING APPARATUS

Filed Oct. 9, 1967  2 Sheets-Sheet 2

INVENTORS
NOEL DAVIS
THOMAS F. VAN DENBERG
BY
Meyer, Tilberry & Body
ATTORNEYS.

United States Patent Office 3,487,997
Patented Jan. 6, 1970

3,487,997
HUMIDIFYING APPARATUS
Noel Davis, Russell Township, Geauga County, and Thomas F. Vandenberg, Moreland Hills, Ohio, assignors to Environmental Growth Control Chambers, Chagrin Falls, Ohio
Filed Oct. 9, 1967, Ser. No. 673,728
Int. Cl. G05d 22/00; F16k 1/00
U.S. Cl. 236—44                                      5 Claims

ABSTRACT OF THE DISCLOSURE

An improved apparatus for controlling the humidity level within a space. The disclosed apparatus includes: a source of relatively low pressure steam connected by pipe means to the space and terminating in a nozzle means for directing steam into the space. Control means responsive to the humidity level within said space are provided for controlling the flow of steam through said pipe means. Additionally, the pipe means include a first pipe section and a second pipe section connected in fluid flow relationship with the included angle between the first and second sections being substantially less than 180° and with the second section extending to the nozzle means and arranged so that any condensate forming in said second section will flow to the juncture of the first and second sections. Further, a condensate receiving means is connected to the juncture and is positioned at an elevation lower than the jucture. The receiving means has a volume sufficient to contain substantially all the steam condensed in the pipe means during periods when steam is not being supplied to the nozzle means; and, drain means including a trap means for preventing steam from exhausting through said drain means connected to the receiving means.

---

The present invention is directed toward the art of humidity control and, more particularly, to an improved steam jet type humidifying apparatus.

The invention is especially useful for controlling the humidity in an environmental growth control chamber and will be described with particular reference thereto; however, it is appreciated the invention is capable of broader application and could be used wherever it is desirable to humidify with a dry steam jet.

Environmental growth control chambers are widely used for maintaining controlled environmental conditions for conducting biological experiments. Because biological things, are closely affected by their environmental conditions, the chambers must be capable of closely maintaining temperature, humidity, air flow, and lighting. For this reason, the chambers generally comprise a well insulated housing defining a sealed test chamber provided with various condition modifying devices in the form of heating and cooling apparatus, a source of high intensity light, circulating fans and an air humidifying apparatus. Generally, these various devices are mounted in a duct or housing positioned adjacent one wall of the test chamber and the air from the chamber continuously circulated through the duct and discharged back to the chamber.

In conducting experiments on plants, it is often required that high and closely controlled conditions of humidity be maintained. This requires humidifying apparatus which has the ability to rapidly supply a large quantity of moisture in response to an indication of a drop in humidity. For this reason, it has been preferable to utilize low pressure steam-jet type humidifiers. The use of the steam jet type has also been desirable from the standpoint of the availability of a low pressure steam supply at most chamber installation sites.

Although the steam-jet type apparatus is preferred, certain problems have prevented efficient utilization of it. For example, in order to properly mix the steam with the air, it is necessary that the steam be injected into the air at a point where the air is moving at a substantial velocity; that is, in the duct, or where it discharges to the test chamber. Injection into the duct was not satisfactory because of problems with condensation on the duct walls and outlet diffuser. Additionally, injection at the duct discharge was not practical because each time the humidity apparatus was turned on or cycled, the steam which had condensed in the supply line during the off period tended to cause "spitting" of droplets of hot condensate onto the plants in the test chamber.

Although some attempts were made to use steam drying apparatus immediately prior to the steam outlet, this generally was expensive and resulted in the addition of substantial heat into the test chamber which made it difficult to closely maintain the temperature level.

The present invention provides a highly simplified steam jet type humidfying apparatus which overcomes the above problems and allows the steam jet to be injected into the air steam leaving the duct without danger of condensate droplets being discharged onto the plants.

In accordance with one aspect of the present invention there is provided an improved apparatus for controlling the humidity level within a space. The apparatus includes: a source of relatively low pressure steam connected by pipe means to the space and terminating in a nozzle means for directing steam into the space. Control means responsive to the humidity level within said space are provided for controlling the flow of steam through said pipe means. Additionally, the pipe means include a first pipe section and a second pipe section connected in fluid flow relationship with the included angle between the first and second sections being substantially less than 180° and with the second section extending to the nozzle means and arranged so that any condensate forming in said second section will flow to the juncture of the first and second sections. Further, a condensate receiving means is connected to the juncture and is positioned at an elevation lower than the juncture. The receiving means has a volume sufficient to contain substantially all of the steam condensed in the pipe means during periods when steam is not being supplied to the nozzle means; and, drain means including a trap means for preventing steam from exhausting through said drain means connected to the receiving means.

In accordance with a more limited aspect of the present invention, there is provided an improved nozzle for supplying substantially dry steam to a space to be humidified. The nozzle includes a chamber defined by a first elongated generally cylindrical member having an open end and a closed end, and adapted to be positioned with its axis inclined upwardly. An elongated steam supply pipe extends centrally through the closed end into the chamber for supplying steam thereto. The supply pipe is provided with steam outlet means arranged to discharge steam from said pipe into impinging relationship with said member; and, a drain line is connected with said chamber for draining the condensate therefrom.

Accordingly, a primary object of the present invention is the provision of a highly simplified steam jet type humidifying system.

Another object is the provision of a steam jet type humidifying system which is especially suited for use in an environment growth control chamber.

A further object is the provision of a steam jet type humidifying system which is arranged to prevent discharge of droplets of condensate into humidified space.

A still further object is the provision of a system of the general type described wherein the nozzle is arranged so as to function as a steam moisture separator so as to separate condensate from the steam.

Yet another object is the provision of a steam jet type humidifying system which can be formed from commercially available fittings.

These and other objects and advantages will become apparent from the following description used to illustrate a preferred embodiment of the invention when read in conjunction with the accompanying drawings wherein:

FIGURE 1 is an elevational cross-sectional view taken through an environmental growth chamber showing the arrangement of the preferred embodiment of the improved steam jet type humidifying apparatus;

FIGURE 2 is a cross-sectional view taken on line 2—2 of FIGURE 1;

FIGURE 4 is an enlarged side view of one of the steam jet nozzles utilized in the apparatus of FIGURE 1;

Figure 3:
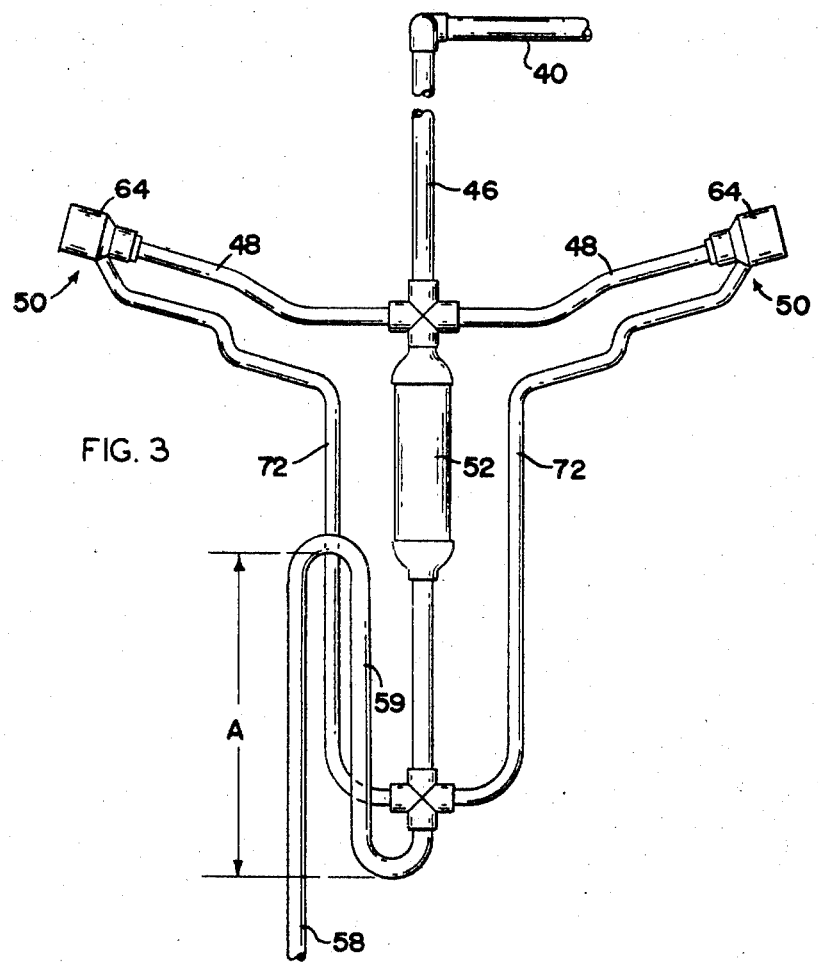
FIGURE 3 is an enlarged detailed view of the humidifying apparatus of FIGURE 1.

Referring now to the drawings wherein the showings are for the purpose of illustrating a preferred embodiment of the invention only and not for the purpose of limiting same, FIGURE 1 shows the overall arrangement of an environmental growth chamber A provided with an improved steam jet type humidifying apparatus B formed in accordance with the preferred embodiment of the present invention.

The actual construction and arrangement of environmental growth chamber A is not important to the present invention; however, it is shown as comprising a test chamber 10 defined by four vertically extending well insulated walls 12. Preferably walls 12 are formed from aluminum sheets bonded to a polystyrene core. The upper end of the chamber is closed by a light cap structure 14 which comprises a downwardly open housing 16 formed from aluminum and defining a lamp chamber 18. Chamber 18 provides a source of high intensity light, such as for example, by having a plurality of closely spaced fluorescent tubes 20 positioned therein. A transversely extending sheet of plexiglass 21 is positioned across the lower open end of the lamp to prevent air flow from the lamp chamber into the test chamber.

Means for controlling the temperature and air flow within the chamber comprise a pair of vertically extending heat exchange units 24. The heat exchange units 24 each includes a self-contained housing 26 formed for example from aluminum sheeting and angle bracket members. Positioned within the housings 24 are the necessary temperature modifying devices such as a cooling coil 28 and an electric heating unit 30. The temperature control units are regulated by the use of conventional control apparatus not shown.

A plurality of axial flow fans 32 are mounted within the housing 24 and arranged to provide a continuous recirculation of air from within the test chamber through an inlet opening 34 and across the various temperature modifying modifying devices to an outlet or discharge opening 36.

As previously discussed, not only must the temperature of the air within the chamber be closely controlled, but also, the humidity must be controlled to within a range of, for example, plus or minus 5% relative humidity. In the past, a variety of different types of humidifying apparatus have been utilized. In general, these prior apparatus have been unsatisfactory for a variety of reasons. For example, previous humidifying apparatus often was not rapid enough in response and tended to unduly disturb the temperature level within the chamber.

The present invention provides an improved steam jet type humidifying apparatus which overcomes the prior problems and allows low pressure steam to be utilized for humidifying the air within the test chamber. As best shown in FIGURES 1 and 3, the apparatus includes a horizontally extending steam supply line 40 which is connected to any convenient source of low pressure steam not shown. Positioned within the line and arranged to control the flow therethrough is a conventional flow control valve 42. Valve 42 is controlled in response to the humidity within the test chamber by a humidistat 44. Humidistat 44 can be any conventional type capable of generating a signal indicative of a need for humidification and causing valve 42 to be opened and closed in response to such signal.

Line 40 extends inwardly through the wall of the chamber to a vertically downwardly extending section 46 to which is connected a pair of generally upwardly extending sections 48. A steam nozzle assembly 50 is connected to the ends of each pipe 48. The nozzles are directed so as to inject the steam directly into the air exiting from exhaust or discharge outlets 36. This assures proper mixing of the steam with the air to produce uniform humidity conditions within the chamber.

As previously discussed, past attempts to utilize low pressure steam directed into the air exiting into the test chamber itself have been unsatisfactory. Because of the constant cycling of the humidifying apparatus, condensation takes place in the steam supply line during the off periods of the apparatus. Consequently, with these prior systems when the sensor again called for humidification the first supply of steam to the chamber produced a substantial amount of spitting and discharge of condensate into the chamber. In the present invention these problems are completely overcome by the unique arrangement of the supply piping and the nozzle construction.

As best shown in FIGURES 1 and 3, the junction between the vertically extending pipe 46 and the generally horizontal and upwardly extending pipe 48 is approximately a right angle. Although the angle could vary, it should be substantially less than 180° so that droplets of condensate entrained in the steam continue in the direction of pipe 46 because of their momentum and do not pass into line 48.

Positioned directly below the juncture between lines 46 and 48 is a condensate receiving chamber 52. The chamber 52 is shown as formed merely from a section of pipe of a diameter substantially larger than pipes 46 and 48. Of particular importance is the fact that chamber 52 is sized so as to have a capacity sufficient to receive all of the condensate which could be expected to collect within the steam supply pipe during an off portion of the cycle of the apparatus. An S-shaped trap pipe 59 is connected to the lower end of receiver 52. This trap has a length A sufficient to maintain a head of condensate sufficient to prevent steam under the pressures utilized from moving through to the discharge line 58.

The arrangement thus far described, removes a substantial portion of the condensate from the steam supplied through line 40. As is apparent, the combination of the direction connection between the supply line and the receiver 52 in conjunction with the right angle connection between the supply line and the horizontally extending lines causes the condensate, through a combination of gravity and momentum, to be discharged into the receiving chamber 52. Because chamber 52 has a volume sufficient to receive all of the condensate within the line, the first surge of condensate can never rise to a level wherein it is over the juncture between lines 46 and 48. Consequently, the steam supplied through lines 48 to nozzles 50 is maintained relatively dry.

Figure 5:
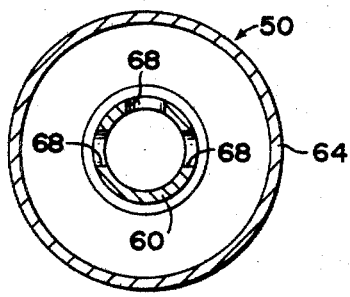
FIGURE 5 is a cross-sectional view taken on line 5—5 of FIGURE 4.

Because there may be some condensate droplets carried into lines 48 and, because a slight amount of condensation may take place in lines 48 during the first moments of flow of steam to the nozzle, nozzle 50 is especially designed to remove these droplets. As best shown in FIGURES 4 and 5 nozzle 50 includes an elongated pipe section 60 which serves as the steam supply line and is connected through a reducer 63 with the outer end of line 48. The outermost end of pipe 60 is closed by a cap 62.

Positioned around the outer end of pipe 60 is a cylindrical deflection shield 64. As shown, deflection shield 64 is formed from a conventional reducer which is soldered or otherwise connected to pipe 60, such as, for example, by a short pipe section 66 positioned in the reduced end portion of the reducer and soldered to both the pipe 66 and the reducer.

Formed circumferentially about the top half of the end of pipe 60 are a plurality of steam outlet openings 68. These outlet openings are arranged to direct the steam from line 60 against the inner wall of shield member 64. Consequently, any condensate entrained in the steam is empelled against the shield. Since, in order to exit from the open end 70 of the shield, the steam must make a substantial right angle turn the condensate is not carried with the steam but remains within the shield. The condensate within the shield is conducted back to the drain line or, as shown, to a low point in the S trap by a line 72. This line is connected to the trap at a point at which there is always condensate, even when the system is under pressure. Consequently, steam can never come through line 72 to the nozzle.

Although it would be possible under certain circumstances to have an outlet nozzle or opening 68 formed on the under side of pipe 60, it is highly preferable that this portion of the pipe be closed. As can be visualized, with the nozzle positioned at a slightly upward direction as shown in FIGURE 1, the condensate droplets collecting within the shield tend to flow downward to the outlet or drain line 72. With an outlet nozzle 68 positioned on the under side of the pipe 60, the condensate flowing to the bottom of the shield would be impacted by steam exiting from this nozzle and, through a wave action, some of it directed out the open end 70 of the shield 64.

Figure 6:
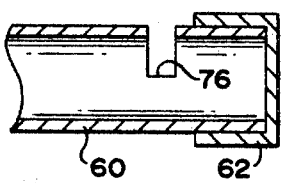
FIGURE 6 is a view similar to FIGURE 4 showing a slightly modified form of nozzle structure.

Although the steam outlets in the pipe 60 are shown as being small diameter circular openings, the same effect can be achieved by the use of an outlet arrangement as shown in FIGURE 6. As shown in FIGURE 6 the outlet opening comprises a simple saw cut 76 which extends downwardly approximately half way through pipe 60 from the upper surface. This arrangement, like that described with reference to FIGURE 4, also directs the steam outwardly against the sides of shield 64 but prevents steam from being directed against the lower half of the shield.

Because of the arrangement of supply piping and the condensate receiver, the steam supplied to the nozzle is relatively dry; however, any condensate which may be carried through this line is quickly and readily removed by the special nozzle design. Consequently, the steam ejected into the air stream is extremely dry and there is no chance of condensate droplets being discharged onto the plants within the growth chamber.

Although the system described shows a pair of nozzles arranged to simultaneously direct the steam coming from a single inlet to the air flow exiting from the two side wall heat exchanger units, it is apparent that substantially any number of such nozzle units could be connected to any one supply line. Alternately, it is of course possible to use a single nozzle unit on each supply line. For example, instead of positioning the nozzle units centrally of the wall between the heat exchangers separate single nozzle units could be positioned at the outside of each heat exchange unit. The actual number and arrangement of the nozzle utilized would of course depend upon the arrangement of the growth chamber.

The invention has been described in great detail sufficient to enable one of ordinary skill in the growth chamber art to make and use the same. Obviously, modifications and alternations of the preferred embodiment will occur to others upon a reading and understanding of the specification and it is my intention to include all such modifications and alterations as part of my invention insofar as they come within the scope of the appended claims.

Having thus described my invention, I claim:

1. Improved apparatus for controlling the humidity level within a space; said apparatus including:

a source of relatively low pressure steam;

pipe means extending from said source to said space and terminating in a nozzle means for directing steam into said space; control means in said pipe means and responsive to the humidity level within said space for controlling the flow of steam through said pipe means; said pipe means including a first pipe section and a second pipe section connected in fluid flow relationship with the included angle between said first and second sections being substantially less than 180° and with said second section extending in a generally upward direction to said nozzle means and arranged so that any condensate forming in said second section will flow to the juncture of said first and second sections;

said nozzle means including a generally tubular shield portion positioned at the end of said second pipe section and outlet arranged to direct steam from said pipe section into engagement with said tubular portion;

a condensate receiving means connected to said juncture and positioned at an elevation lower than said juncture; said receiving means having a volume sufficient to contain substantially all the steam condensing in said pipe means during periods when steam is not being supplied to said nozzle means; drain means connected to said receiving means, said drain means including a trap means for preventing steam from exhausting through said drain means; and, a second drain means extending from said tubular portion of said nozzle means.

2. The apparatus as defined in claim 1 wherein said trap means includes pipe means for maintaining a head of condensate therein greater than the pressure of said steam.

3. The apparatus as defined in claim 1 wherein said first pipe section and said condensate receiving means extend vertically.

4. The improvement as defined in claim 1 wherein said condensate receiving means comprises a vertically downwardly extending pipe connected directly to the juncture of said first pipe section and said second pipe section and wherein said drain means comprises a pipe connected to said condensate receiving means.

5. The improvement as defined in claim 5 wherein at least a portion of said first pipe section extends vertically downwardly toward said condensate receiving means.

References Cited

UNITED STATES PATENTS

| 545,550 | 9/1895 | Symons | 137—179 X |
|---|---|---|---|
| 568,145 | 9/1896 | Sanderson | 137—171 |
| 614,099 | 11/1890 | Griep | 137—171 |
| 2,314,892 | 3/1943 | Papulski | 236—44 |

WILLIAM E. WAYNER, Primary Examiner

U.S. Cl. X.R.

137—171; 165—3; 261—115